United States Patent [19]

Jones

[11] 3,981,338

[45] Sept. 21, 1976

[54] METHOD OF MAKING A COMPRESSED WOOD PANEL FROM PEELED LOGS

[76] Inventor: Charles A. Jones, 26 Gladstone Ave., Oshawa, Ontario, Canada

[22] Filed: Aug. 4, 1975

[21] Appl. No.: 601,868

Related U.S. Application Data

[63] Continuation-in-part of Ser. No. 529,868, Dec. 4, 1974, abandoned, which is a continuation of Ser. No. 351,908, Aug. 17, 1973, abandoned.

[52] U.S. Cl. ............................ 144/309 D; 144/311; 144/317; 144/327; 264/139; 264/259; 264/261; 264/263; 264/265; 264/266; 264/279; 264/294; 264/320

[51] Int. Cl.$^2$ ....................... B27K 3/15; B27L 1/00; B29D 3/00; B29G 1/00

[58] Field of Search ........... 264/122, 120, 128, 136, 264/261, 263, 259, 271, 274, 277, 294, 331, 265, 266, 279, 139, 320; 144/309 D, 309 R, 311, 315 R, 317, 327

[56] References Cited

UNITED STATES PATENTS

| | | | |
|---|---|---|---|
| 72,873 | 12/1897 | Maitre | 144/311 |
| 2,218,897 | 10/1940 | Skutl | 264/122 |
| 2,370,033 | 2/1945 | Hall | 144/327 |
| 2,666,463 | 1/1954 | Heritage | 144/327 |
| 2,741,283 | 4/1956 | Alexander | 144/311 |
| 3,107,708 | 10/1963 | Savage | 144/327 |
| 3,660,223 | 5/1972 | Casalina | 264/128 |
| 3,700,533 | 10/1972 | Schmitz | 264/277 |

*Primary Examiner*—Willard E. Hoag
*Attorney, Agent, or Firm*—Ladas, Parry, Von Gehr, Goldsmith & Deschamps

[57] ABSTRACT

A method of making a compressed wood product such as a building panel from raw wood. Tree length logs are cut to convenient lengths, debarked and dried, and then placed in a mold where they are immersed in suitable liquid adhesive and compressed to a dimension smaller than that finally required. The logs are then allowed to expand while still immersed in the adhesive, and are then again compressed to the final desired thickness of the panel. The logs are then subjected to elevated temperature to harden the adhesive, preferably while expansion of the logs is prevented. The invention also comprises special apparatus for carrying out the process, and particularly a mobile platform for carrying the logs and forming part of the mold, and a cover and clamp means for maintaining pressure on the wood.

10 Claims, 6 Drawing Figures

METHOD OF MAKING A COMPRESSED WOOD PANEL FROM PEELED LOGS

Figure 1:
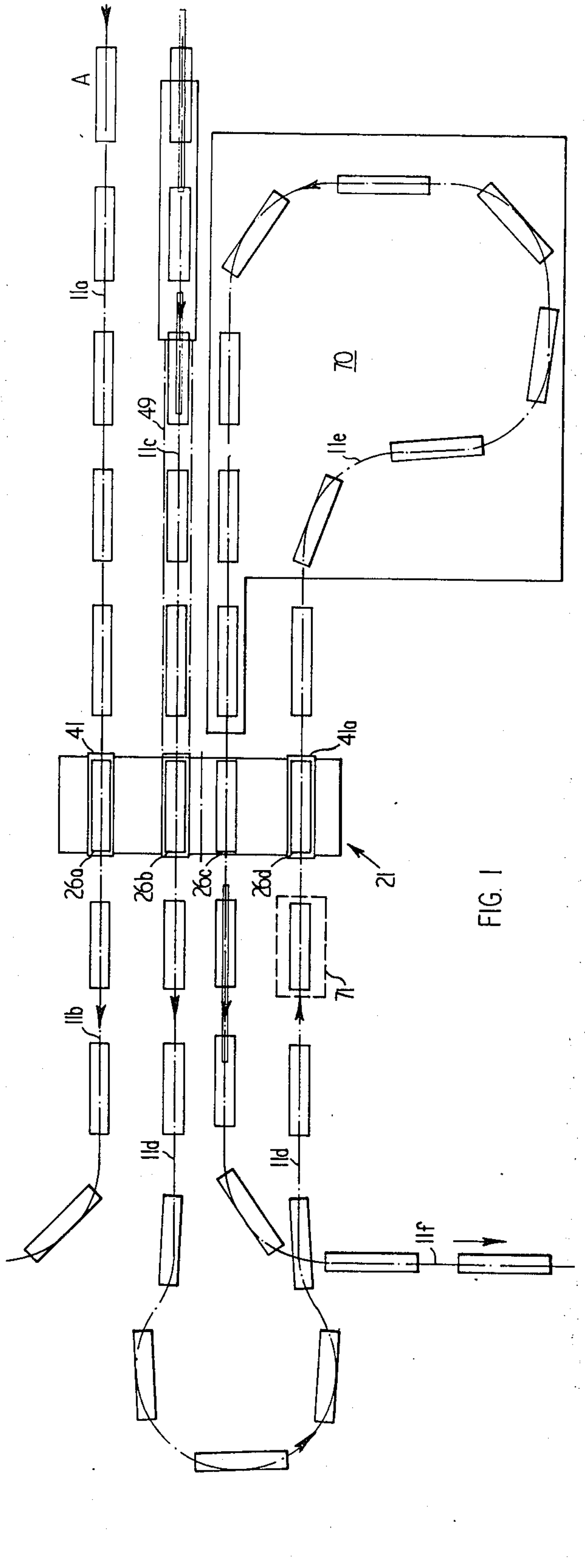

This application is a continuation-in-part of U.S. application Ser. No. 529,868, filed Dec. 4, 1974 and now abandoned, which was a continuation of Ser. No. 351,908, filed Aug. 17, 1973 and also now abandoned. The invention relates to the production of large size building panels having good mechanical properties. The invention makes use of logs of wood of relatively large size, up to 40 feet in length, and produces large sizes of building panels for example up to 20 foot or 40 foot in length. The process can make use of logs which would otherwise go to waste.

Various processes have been proposed and used for producing panels of wood in which the wood is impregnated with an adhesive and subjected to elevated temperature and high pressure to set the adhesive. Such processes give a product having mechanical properties better than those of natural wood, and can make use of wood otherwise scrapped. However, most of the processes so far disclosed have produced only relatively small wood panels. One reason for this is that thre conventional process, in which impregnation and hardening occur in situ in the mold, has a relatively low output for each mold since this has to be occupied by the panel during the whole of its hardening time. Large articles require a correspondingly long hardening cycle and thus with the conventional process the large panels would occupy a large and expensive mold for a long period.

The present invention provides a process which overcomes this problem. The invention also provides a process in which impregnation of the adhesive into the wood is enhanced by a two stage pressing operation to be described.

In accordance with one aspect of the invention, a process for forming panels comprises the steps of arranging in a mold a plurality of debarked dried logs, the logs being arranged in parallel relationship across the mold, the mold having side walls to retain liquid, adding suitable liquid adhesive to the mold to substantially fill the spaces between the logs, moving the mold under a pressure applying means and subjecting the logs to mechanical pressuure applied uniformly over the logs in a first pressing stage to reduce the overall thickness of the logs in the mold to less than the chosen panel thickness, and releasing the pressure to allow the logs to expand while immersed in adhesive so that their overall thickness becomes greater than the chosen final panel thickness, whereby the adhesive is sucked into the logs. The logs are then subjected to a second pressing stage in which mechanical pressure is applied uniformly over the logs at a pressure less than that applied by the pressure applying means in the first stage to remove excess adhesive from the logs, whereafter excess liquid adhesive is drained from the mold. The logs are then moved to an oven wherein the logs and adhesive are subjected to elevated temperatures preferably while expansion of the logs is prevented. After removal of the mold from the oven the finished panel is taken from the mold.

Preferably, a cover is provided for the mold which is applied on to the top of the logs before the second pressing stage, and clamps are applied to hold the cover in place relative to the mold after the panel has been reduced to its final thickness, the clamps and cover preventing any expansion of the panel.

In one embodiment, the logs are completely treated in a single mold; this carries the logs through the impregnation stages and then through the oven. In a variation of the process, the impregnating operations are performed in a mold, and after the logs have been subjected to the second pressing stage to remove excess adhesive, the logs are unloaded and re-loaded onto trucks which carry the logs through the oven. In this variation, the logs will require a third pressing operation additional to the second pressing stage which removes the adhesive. The third pressing stage may occur either before the logs go into the oven, or after the oven, if the adhesive used is of a type which is still soft when the logs leave the oven. The aforementioned cover and clamps are used after this third pressing stage.

Even when the same mold is used, without the reloading step referred to, a third pressing operation is still generally desirable.

According to another aspect of the invention, apparatus for producing building panels comprises a mold for receiving a series of logs, the mold having sides for retaining liquid and having means allowing for draining of liquid therefrom, a cover for the mold, the cover being capable of applying uniform pressure across the top of logs held in the mold when the cover is held relative to the mold by clamp means applied to its sides, and clamp means for inter-engaging the sides of the mold and the cover and for restricting upward movement of the cover relative to the mold. Pressure applying means is provided for pressing downwardly on the cover to subject the logs within the mold to compressive forces, preferably sufficient to reduce the diameter of the logs to about half their initial diameter. The apparatus also provides an oven for receiving the mold and cover.

An important distinction between the present invention and the prior art is the use of logs of up to forty feet in length, and which preferably extend the full width of the building panels being produced and thereby impart high strength to the panels; the fibre strength of the wood is retained.

Another distinction over the prior art is the two stages of pressing, whereby in the first stage the thickness of the logs in the mold is reduced to less than the final desired thickness of the panel, and whereby the logs are allowed to expand while immersed in the liquid adhesive thereby soaking up this adhesive into empty spaces in the logs from which air has been expelled by the first stage of pressing. In the second stage of pressing, the well impregnated logs are pressed down to approximately the required panel thickness; however the third pressing stage may be used for final dimensioning.

A two stage pressure process is described in Australian Pat. No. 118,057 to Frederick Rose Limited, however this prior patent does not describe the feature of using an initial pressure which reduces the thickness of the logs to less than the final thickness, nor does it mention having the wood immersed in adhesive during expansion so that adhesive is sucked into the wood in this stage. In the Australian patent, the initial pressing serves the purpose of reducing the final pressure required to be applied in the molding stage, the initial pressing being done by rollers or other means which apply pressure to portions of the wood only and which therefore require little total force. This initial pressing does reduce the pressing requirements for the final pressing stage, as is the case with the present invention, but does not assist in impregnating the logs. Furthermore, the Australian patent does not suggest moving the mold from under the pressure applying means into an oven while restraining expansion of the logs, and it appears that setting of the adhesive occurs while pressure is being applied to the mold, thus occupying the pressure applying means for the whole period required for hardening of the panel.

In one experiment using the process of the invention, dry round peeled poplar logs of 5¼ inches in diameter was selected as the wood, and the adhesive was a phenolic resin known as Gulf Perpreg 193 (a Trademark for a 50% solids phenols-formaldehyde resin forming mixture, especially compounded to give maximum diffusion into wood cells; this adhesive is diluted with an equal volume of water). Pieces of wood, cut to approximately the length of the rectangular mold were put as one layer into the mold, and small splits of wood were used to fill spaces therein. The mold was heated to 90°F. and, after a top cover was put on the mold, pressure was applied thereto by hydraulic means until a pressure of 1,000 lbs. per square inch was reached. The time taken to reach this pressure was about 2 minutes. This caused compression of the wood to less than the final desired panel thickness.

Three hundred sixty ounces of the adhesive at 90°F was then added, and the pressure was gradually released over a period of 20 seconds. During the release of pressure, the compressed wood was seen to suck in the adhesive into its fibres, and this suction in fact continued for about 1 minute. The compressed wood was then allowed to remain a further 5 minutes soaking in the adhesive. Alternatively, the mold and contents can be passed through a bath of adhesive, and pressure applied thereafter.

Pressure was then re-applied to about 500 lbs. per square inch, and then maintained by clamps holding the top cover to the mold to prevent expansion of the wood. The mold and its contents were then placed in an oven at a temperature of 300°F and baked for 2¾ hours, this time being approximately ½ hour per inch thickness of the original wood. The mold was then allowed to cool and the clamps removed. Alternatively, the mold and contents can be heated to the predetermined temperature before the clamps are applied.

The resultant product was a panel with length and width equal to those of the mold, and a thickness of 2½ inches, the wood having thus been compressed from 5½ inches to 2½ inches. It was found that 28 ounces of adhesive had been absorbed by the wood.

Wood such as fir, pine and spruce can also be used. For some wood, the adhesive can be diluted. The adhesive known as Perpreg produced a substantially waterproof and weatherproof finish. Pressures of up to 3,000 lbs. per square inch may be required in some cases.

Figure 2:
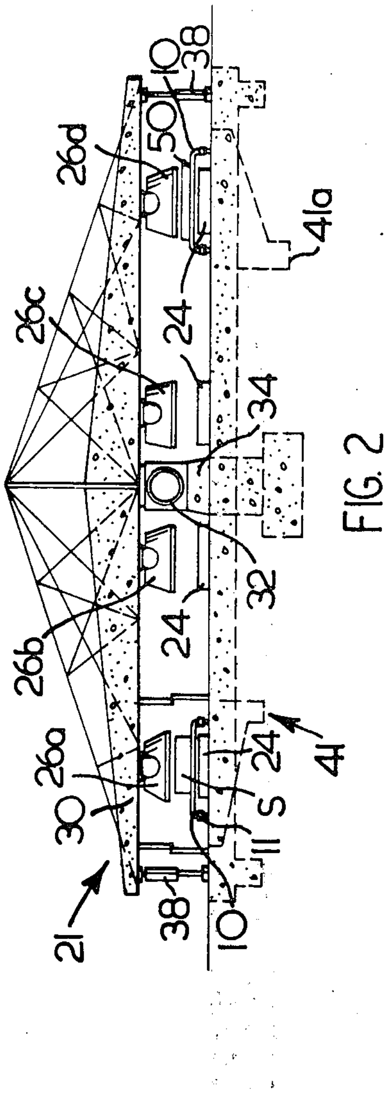
Figure 3:
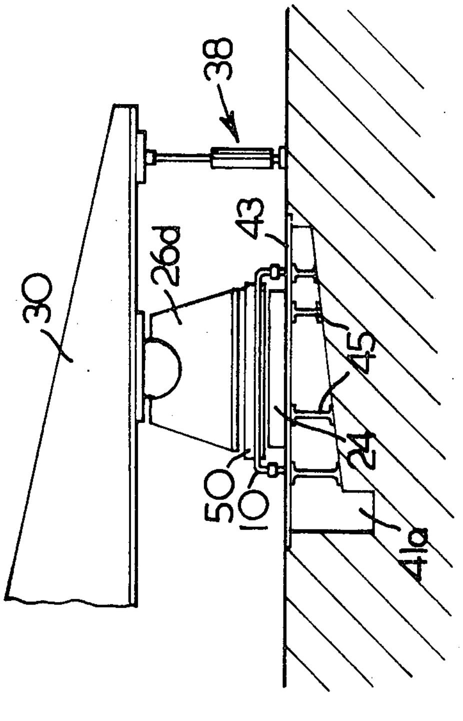
Figure 5:
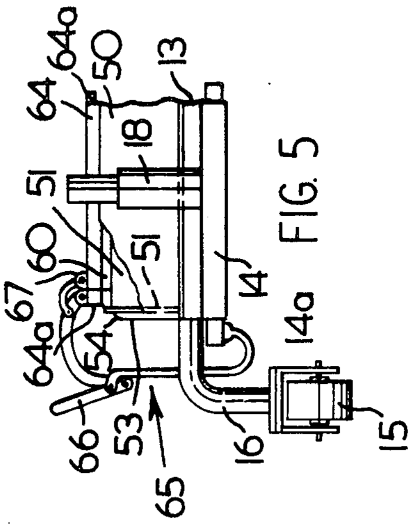
Figure 6:
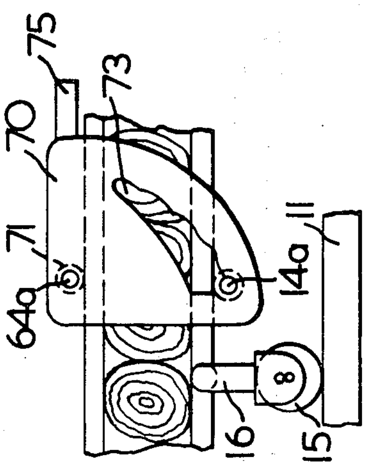
Figure 4:
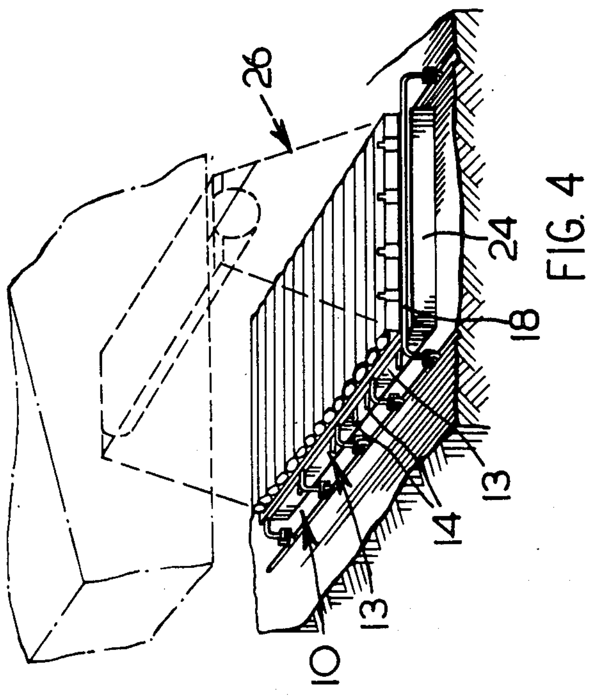

A preferred form of apparatus for carrying out the invention on a large scale will now be described by way of example with reference to the accompanying drawings, in which:

FIG. 1 is a plan lay out view of main parts of a plant for producing panels in accordance with the invention, FIG. 2 is an elevation of a hydraulic press used in the process of this invention, FIG. 3 is an enlarged view of a part of the press shown in FIG. 2, FIG. 4 is a perspective view of a mold carrying the logs and being pressed in the hydraulic press, FIG. 5 is a detailed view of a mold and associated parts, and FIG. 6 is a view of an alternative embodiment of clamp.

The plant of which a part is shown in FIG. 1, and of which components are shown in FIGS. 2 and 3, is designed to receive cut green logs from a forestry operation, and to convert these into the final building panels.

The green logs when delivered go through a debarking process which is described in detail in my copending patent application Ser. No. 544,547 filed Jan. 27, 1975. The unbarked logs are piled on the platforms 13 of trucks 10 movable on rails 11 to carry the logs through the various process operations.

The trucks 10 comprise essentially beds or platforms 13 40 foot in length and 11 foot in width. This platform comprises a solid steel plate about 1 inch thick, capable of resisting the pressures in the molding process to be described without undue deformation, and which is stiffened by a series of 21 heavy gauge steel pipes 14 of 1⅞ inches diameter welded to the under side of the platform, as shown in FIG. 5. Steel shafts 14*a* of 1⅞ inches diameter extend along the pipes with a 1½ inches length extending beyond the end of each pipe; these shafts are welded in place. The platforms 13 are mounted on wheels 15 which are held by spring suspensions at the outer ends of legs 16, shown most in FIG. 5. The ends of the platforms are provided with a series of four spaced vertical guideposts 18, shown in FIG. 5, which have upper end portions of reduced diameter and suitable for removably receiving extension posts which are used to retain the ends of the log piles used in the debarking process described in the aforesaid Application Ser. No. 544,547.

In the path of the trucks 10 from the loading station, from which station the trucks enter the part of the plant shown in FIG. 1 at A, is a pressure applying station indicated at 21 in FIG. 1. This station comprises a series of four press bases 24 and a series of corresponding pressure heads 26, best shown in FIG. 2. Each press base 24 is a solid and strong metal structure which has a height such that its upper surface fits just below the tubes 14 of the trucks 10, and the pressure member or head 26 is a further strong pressure applying member with a flat lower surface and moved in a manner to be described to descend forefully on logs carried by the platform 13 of a truck 10. The heads 26 are part of a large hydraulic press comprising essentially a large and very strong overhead beam 30 of reinforced concrete construction, tiltable about its center on a strong bearing 32 held by a rigid foundation member 34. The beam carries two spaced pressure heads 26 on each side of its center, these being pivotably attached to the beam to that they can remain horizontal as the beam pivots. A series of hydraulic cylinders 38 are connected to each end of the beam to cause this to rock about its central pivot. The press bases 24 are positioned below each of the pressure heads 26, and are also positioned between sections of the rail 11 so that the trucks 10 moving along the rails can successively position the platform of a truck above the press base 10. The truck and press base are so arranged that when pressure is applied to the logs by a pressure head 26, the wheel suspensions give sufficiently to allow the tubes 14 to rest on the press base 24 so that the press base taken the force of the pressing operation and undue force is not communicated to the wheels of the truck.

The pressure head 26*a*, which is used in the debarking process of application Ser. No. 544,547, and which is shown at the left hand side of FIG. 2, has an operative lower surface spaced sufficiently above the truck 10 to allow a four foot high pile of unbarked logs, carried by the truck along rails 11*a*, to be positioned thereunder. The remaining pressure heads 26*b*, 26*c*, and 26*d*, which are used in the process of this invention for producing molded panels, have lower surface spaced (with beam 30 horizontal) about 5 to 6 inches above the top of the platform 13 of a truck. It will be evident that the heads 26*b* and 26*c*, being closer to the fulcrum of beam 30 than the remaining heads, can apply much greater compressive force than the remaining heads. In fact, the pressure heads 26*b* and *c* are capable of applying almost 50,000 tons of total pressure, while the remaining heads apply about ¼ of this (12,500 tons).

In the processes to be described, liquid is expelled from the wood when being pressed under the heads 26*a* and 26*d*. To collect this liquid, pits 41, 41*a* are provided under these pressure heads. Details of the arrangement provided under heads 26*d* are shown in FIG. 3, which shows a grating 43 providing a deck at floor level about the pit, and steel supports 45 extending upwardly from the base of the pit to support the rails 11 and the press base 24. Details of the arrangements provided under head 26*a* are described in copending application Ser. No. 544,547. The sump from pit 41*a* drains into a bath 49 (indicated in FIG. 1) and which is used to provide a source of the adhesive applied to the wood, so that the arrangement described provides a recovery for adhesive expelled during operation of the pressure head 26*d*.

Further parts of the molding apparatus are shown in FIGS. 4 and 5. These include a liquid retaining wall 50 which is an annular steel plate wall about 6 inches high, having attached to its lower edge a soft rubber sealing gasket. The gasket is sized to seal against a flat perimeter portion of the platform 13, so as to form with this a reasonably liquid tight container and which is capable of acting as a mold for the impregnation step. The wall is sized to allow the logs of about 10 feet 6 inches length to be arranged cross wise therein, and the wall 50 also has sufficient space for each of the pressure heads 26*b*, 26*c*, and 26*d* to come down inside the wall. Each side of wall 50 has two apertures 51 adjacent its lower edge, these apertures being normally closed by plates 53 retained in guideways 54. The plates 53 can be raised manually to provide quick drainage of liquid from inside the wall, when this is required.

A further item of the apparatus is the top cover 60, also shown in FIGS. 4 and 5. This is a steel plate of about 1 inch thickness reinforced by 21 pipes 64 arranged cross wise across the top of the cover, and which correspond to pipes 14 on the lower surface of the platform 13. Steel shafts 64*a* extend along the pipes and have projecting ends vertically spaced above the ends of pipes 64*a* and suitable for being clamped together by clamps shown at 65, these clamps having quick release handles 66. The clamps have a hook on thier upper jaws engageable with metal loops 67 on the ends of shafts 64*a;* this retains the clamps in place until the cover is suitably pressed by the press head, after which the lower jaws automatically engage on the ends of shafts 14*a*.

Another major item of the apparatus is a heating oven shown in FIG. 1 at 70. This is capable of heating the partly formed panels to about 300° to 350°F.

The rails 11 which move the trucks 10 through the various stages illustrated in FIG. 1 include an initial portion leading from the entry point A from the loading station to the first pressure head 26*a*, a second portion 11*b* extending from pressure head 26*a* through various debarking stages (described in application Ser. No. 544,547), a third portion 11*c* extending from a reloading station for the debarked logs and leading over the adhesive bath 49 to the pressure head 26*b*, a portion 11*d* leading from the pressure head 26*b* to the pressure head 26*d*, a portion 11*e* leading from pressure head 26*d* through the oven 70 and then under the pressure head 26*c*, and a final exit portion 11*f*. The portion 11*d* also passes through a work station 71 just next to pressure head 26*d*, this being provided for the positioning of the clamps 65.

In the preliminary debarking process claimed in application No. 544,547, the green unbarked logs are formed into a stack four foot high on a truck 10, and advanced along the rails 11*a* until under the pressure head 26*a*. The hydraulic cylinders 38 are operated to compress the logs, causing juices to squirt from the ends of the logs, the juices being collected in pit 41. This procedure loosens the bark on the logs, and the logs then pass along rails 11*b* to debarking apparatus (not shown in FIG. 1) described in application Ser. No. 544,547 which removes the bark. After the bark has been removed the logs are dried at temperatures of around 225° to 250°F, until their moisture content is around 2%.

After drying is completed, logs are unloaded from trucks 10, and then the wall 50 is suitably positioned on the platform of a truck, and a smaller quantity of logs is then loaded in the mold which is provided by the wall 50 and platform 13. Generally only a single thickness of logs will be used, preferably with the spaces between the round logs being filled in by smaller pieces of wood, and so that the total height of the wood on the platform is 5 to 6 inches. The logs are moved on trucks 10 to the area above the tank 49 where liquid adhesive is pumped from the tank through nozzles into the mold until the wood is substantially immersed. At this stage of course the plates 53 close the apertures in the wall 50 to prevent loss of adhesive. The preferred adhesive is the Gulf Perpreg referred to above.

The cover 60 is then placed on the logs, and the truck is then moved under the pressure head 26*b*, and hydraulic cylinders 38 are actuated to cause the pressure head to decend forcefully on cover 60, compressing the logs. Preferably, a total pressure in the region of 43,000 tons is applied at this stage, giving a pressure of slightly less than 1,500 pounds per square inch. This pressure reduces the logs to a height slightly less than ½ their initial height, and also slightly less than the desired panel thickness. At this stage, the reinforcing pipes 14 of the platform 13 are resting on the press base 24, by virtue of the spring suspension of wheels 15.

After release of pressure, the truck 10 moves onto the rail portion 11*d*, and the logs are allowed to expand to greater than the eventual panel thickness. During the initial compression, air in the interior spaces of the dry logs has been forced out of the logs and bubbled to the surface of the adhesive, and since expansion takes place with the logs still largely immersed this expansion sucks in the adhesive into the former air spaces in the logs, giving good impregnation.

The truck 10 then moves along the rails to the clamp applying station 71, where the clamps 65 are hooked onto position on shafts 64*a*, and the truck then moves under the pressure head 26*d*. The cover and logs are here subjected to somewhat lighter pressure (around 12,000 tons) which brings the logs to approximately the final design panel thickness. This second pressing stage removes excess liquid adhesive from the logs, and also causes the clamps to pivot and engage shafts 14*a*. This liquid, and any not absorbed by the wood, is drained from the mould by raising plates 53, the liquid draining into pit 41 and from there returning to bath 49. The trucks then pass into the oven 70 and are heated to a temperature in the range of 300° to 350°F for about 2¼ hours. This heating removes water from the adhesive and causes this to harden; in this stage the clamps prevent any subsequent expansion of the panel beyond this stage, so that the panel is held at least close to the intended final thickness.

In a final pressure stage, which however is optional, the trucks pass to the pressure head 26*c*, where the whole panel is then again subjected to strong pressure which however only causes a small decrease in thickness, to adjust the thickness to the desired final quantity. After leaving this stage on rail portion 11*f*, the top cover is removed from the mold, and the formed panel is also removed.

In one variation of the above described process, a load of logs equivalent to several panel thickness is impregnated in a single operation. For this operation special trucks are used, generally similar to those described above, but having side walls 24 inches in height, equipped with drainage means as with the removable sidewalls already described. A load about 24 inches high of logs is placed on the trucks, within the sidewalls, and the adhesive is added. The whole load is subjected to a pressure of about 1,500 psi, under pressure head 26*b*, and the pressure is then released to allow the logs to such in the adhesive. Excess adhesive is then drained off. The impregnated logs are then transferred to trucks 10, and go through the remaining processes of heating in the oven, and final pressing as previously described.

This variation of the process avoids the need to load the removable side walls onto each truck. Furthermore, the design of the clamps used to hold the lids of the truck in place is simplified in that these do not have to go up and over the removable sides 50 previously described, and a clamp of the type shown in FIG. 6 can be used.

These clamps are formed of a heavy piece of steel plate 70, having an aperture 71 for receiving the rod 64*a* of the cover 60, and having a slot 73 with a series of notches along the side of the slot remote from aperture 71. Each of the notches provides a surface engageable with the rod 14*a* of the truck base, and the notches are positioned so that the rod engaging surfaces are spaced from aperture 71 by ½ inch intervals. Each clamp has a stub shaft 75 extending from one corner for release purposes. The clamps are positioned by apertures 71 being placced on rods 64*a*, with rods 14*a* extending through slots 73, and on compression of the cover 60 relative to the base 13 the clamp pivots down around rod 64*a* until rod 14*a* is engaged by the notch appropriate to the compression which has been applied; the clamp remains locked in this position until released by upwards leverage applied to shaft 75 by an appropriate tubular handle.

In order to produce panel thicknesses varying by ¼ inches two sets of clamps will be required, one having notches appropriate for 2½, 2, 1½, 1,½, and the other set having notches for 2¼, 1¾, 1¼, ¾, and ¼ inches.

A further advantage of the triangular clamps just described, apart from their simplicity, is that they automatically lock the lid in position after the third pressing operation as well as after the second. This is advantageous in giving a strong and properly dimensioned final product.

In this variation of the process, the means of logs being impregnated is not of course reduced to less than the final required panel thickness, but each log is reduced to a lesser thickness than that required in the final panel. Normally, a panel will be only one log thickness.

In another variation of the process, the second pressing, performed under head 26*d*, serves principally to expel excess adhesive from the wood at this stage, and no clamps are used to hold the lid in place during travel through the oven. The head 26*c* is used to give the final dimensional pressing, and clamps are applied at this stage. The exact sequence to be used will depend on the nature of the adhesive used, i.e. whether this hardens appreciably within the oven, or whether the panel is still soft when leaving the oven and hardens gradually on cooling.

It may be seen that the above specification, taken along with that of application Ser. No. 544,547, provides a whole plant for receiving green, unbarked timber, and converting this into wood panels. The panels although being of large size, can be strong by virtue of using logs which extend from end to end of the mold.

I claim

1. The process for producing building panels, comprising the steps of:

arranging in a mold a plurality of debarked dried logs, said mold having side walls to retain liquid, adding a suitable liquid adhesive to said mold to substantially fill spaces between the logs, moving said mold under a pressure applying means and subjecting said logs to mechanical pressure applied uniformly over said logs in a first pressing stage to reduce the overall thickness of said logs in the mold to less than the thickness required for the chosen panel releasing said pressure to allow the logs to expand while substantially immersed in adhesive so that their overall thickness becomes greater than the chosen final panel thickness while said adhesive is sucked into the logs, subjecting said logs to mechanical pressure applied uniformly over said logs in a second pressing stage, to remove excess adhesive from said logs, the pressure applied in said second stage being less than said first stage, draining excess liquid adhesive from said mold, moving said logs to an oven therein subjecting the logs and adhesive to elevated temperatures in a mold, to form a panel.

2. A process according to claim 1, wherein said logs have substantially equal lengths and extend from one side of the mold to the other in parallel relationship.

3. A process according to claim 1, including a final pressing stage, after said logs have been treated in the oven, said final pressing stage reducing the dimensions of the panel to the final required thickness.

4. A method according to claim 1, wherein the maximum pressure applied to the logs is of the order of 800 to 1,500 pounds per square inch.

5. A method according to claim 1, wherein the adhesive is a phenolic resin.

6. A method according to claim 1, wherein the logs in the oven are subjected to a temperature of the order of 300°F to 350+F.

7. A method according to claim 1, wherein said logs are arranged in the mold as a single layer, with spaces between said logs being partially filled by lengths of wood of smaller diameter than said logs, and wherein said logs remain in the same mould during the impregnating and heating steps of the process.

8. A process for producing building panels, comprising the steps of, arranging in a mold a plurality of debarked dried logs, said mold having side walls to retain liquid, adding a suitable liquid adhesive to said mold to substantially fill the spaces between the logs, placing a top cover on said logs, subjecting said top cover and logs to mechanical pressure applied uniformly to said cover to reduce the overall thickness of said logs in the mold to less than the chosen panel thickness, releasing said pressure to allow the logs to expand while immersed in adhesive so that their overall thickness becomes greater than the chosen final panel thickness while said adhesive is sucked into the logs, subjecting said top cover and logs to mechanical pressure in a second pressing stage to remove excess adhesive, said pressure being less than that applied in the first pressing stage, and such as to reduce the thickness of the logs to approximately the final chosen panel thickness, draining excess liquid adhesive from the mold, applying clamp means to restrict upward movement of the top cover relative to the mold and thereby to prevent expansion of said logs, moving said mold, cover and clamp means into an oven and thereby subjecting the logs and adhesive to elevated temperatures, removing the mold from the oven, removing the clamp means and the cover from the mold, and then removing the finished panel from said mold.

9. A process according to claim 1, wherein said logs are arranged to form a plurality of layers in said mold, and wherein after said second pressing stage said logs are unloaded from the mold and loaded onto platforms as a single thickness, and wherein a third pressing stage is used to reduce the dimensions of the impregnated logs to the chosen final panel thickness.

10. A process for producing panels, comprising the steps of:

placing moisture containing bark carrying logs on a platform, subjecting the logs to mechanically applied compressive force by means of a pressure member applied to the tops of the logs, said force being sufficient to expel juices from said logs whereby the bark on the logs becomes loosened, removing the logs from the platform and then removing the bark from the logs, drying the logs in an oven, arranging in a mold a plurality of the debarked dried logs, said mold having side walls to maintain liquid, adding a suitable liquid adhesive to said mold to substantially fill the spaces between the logs, moving said mold under a pressure applying means and subjecting said logs to mechanical pressure applied uniformly over said logs in a first pressing stage to reduce the overall thickness of said logs in the mold to less than the chosen panel thickness, releasing said pressure to allow the logs to expand while substantially immersed in adhesive so that their overall thickness becomes greater than the chosen final panel thickness while said adhesive is sucked into the logs, subjecting said logs to mechanical pressure applied uniformly over said logs in a second pressing stage, the pressure applied in said second stage being less than said first stage, draining excess liquid adhesive from said mold, moving said logs and said mold from under said pressure applying means to an oven and thereof subjecting the logs and adhesive to elevated temperatures to form a panel.

* * * * *